United States Patent
Qiu et al.

(10) Patent No.: US 8,503,192 B2
(45) Date of Patent: Aug. 6, 2013

(54) ELECTRONIC DEVICE WITH ADHESIVE-LESS FIXED FLAT CABLE

(75) Inventors: Ji-Feng Qiu, Shenzhen (CN); Hong Li, Shenzhen (CN); Xiao-Hui Zhou, Shenzhen (CN); Rui Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 361 days.

(21) Appl. No.: 13/076,400

(22) Filed: Mar. 30, 2011

(65) Prior Publication Data
US 2012/0206898 A1  Aug. 16, 2012

(51) Int. Cl.
*H05K 9/00* (2006.01)
(52) U.S. Cl.
USPC .......................... 361/818; 361/799; 361/816
(58) Field of Classification Search
USPC ................. 361/799, 816, 818, 807, 809, 810, 361/825, 826
See application file for complete search history.

(56) References Cited

U.S. PATENT DOCUMENTS

| | | | |
|---|---|---|---|
| 5,334,798 A * | 8/1994 | Kalis | 174/376 |
| 6,342,932 B1 * | 1/2002 | Terao et al. | 349/58 |
| 7,369,400 B2 * | 5/2008 | Bang et al. | 361/679.27 |
| 7,430,124 B2 * | 9/2008 | Voon et al. | 361/728 |
| 8,116,099 B2 * | 2/2012 | Kubota | 361/803 |
| 2005/0048809 A1 * | 3/2005 | Bolen et al. | 439/67 |
| 2013/0002980 A1 * | 1/2013 | Meng | 349/59 |

* cited by examiner

*Primary Examiner* — Hung S Bui
(74) *Attorney, Agent, or Firm* — Altis Law Group, Inc.

(57) ABSTRACT

An electronic device includes an EMI shielding board, two electronic components and a flat cable. The EMI shielding board includes a first side and a second side opposite to the first side. The two electronic components are arranged at the first side of the EMI shielding board. The flat cable is connected between the two electronic components. The EMI shielding board further includes a first through slot and a second through slot both configured therein. The flat cable passes through the EMI shielding board via the first and second through slots. A part of the flat cable is on the first side of the EMI shielding board, and the remaining part of the flat cable is on the second side of the EMI shielding board.

7 Claims, 2 Drawing Sheets

ELECTRONIC DEVICE WITH ADHESIVE-LESS FIXED FLAT CABLE

BACKGROUND

1. Technical Field

The present disclosure generally relates to electronic devices, and particularly to an electronic device with an adhesive-less fixed flat cable.

2. Description of Related Art

Many kinds of electronic devices (such as DVD player, notebook computer, or projector), are often equipped with flat cables for transferring data among the components of the electronic devices. Generally, the flat cables are adhered to supporting structures, for example frames, with adhesives. However, the adhering procedure is time consuming and leads to increased cost. Furthermore, during repairing of the electronic devices, the flat cables may be damaged when they are removed from the supporting structure.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure.

DETAILED DESCRIPTION

Reference will now be made to the drawings to describe the present electronic device in detail.

Figure 1:
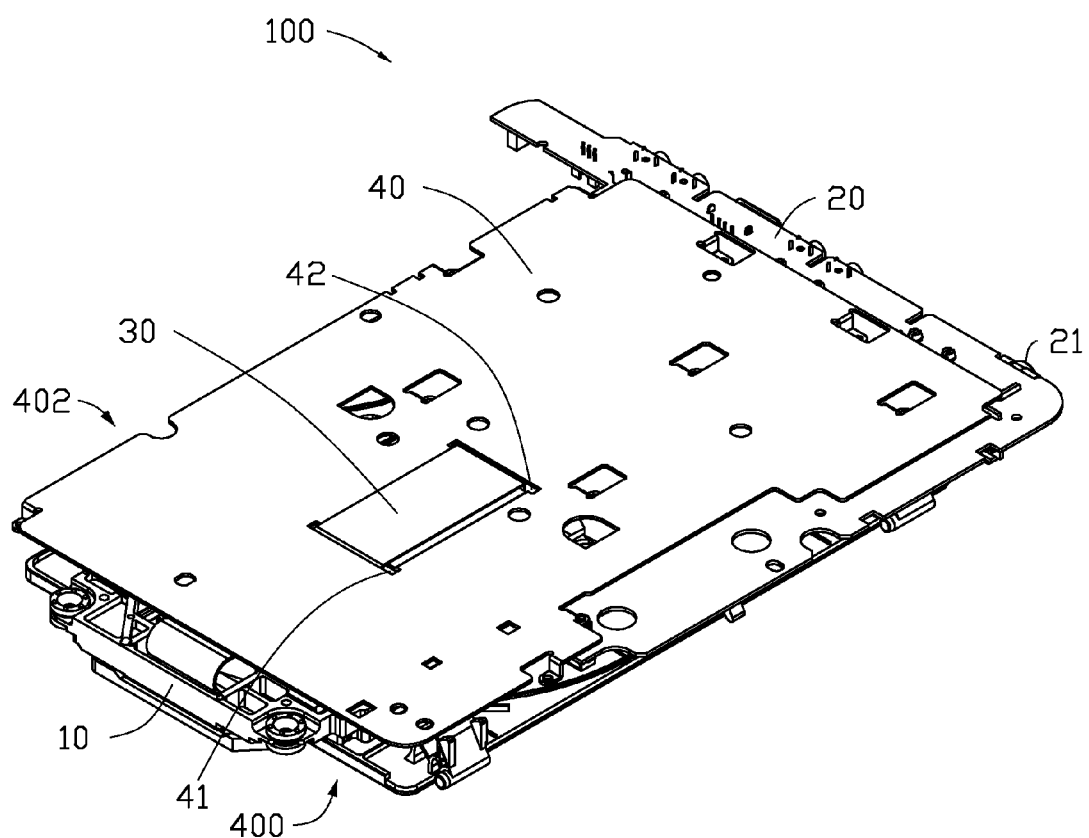
FIG. 1 is a schematic view of an electronic device with glue-less fixed flat cable in accordance with an exemplary embodiment of the present disclosure.
Figure 2:
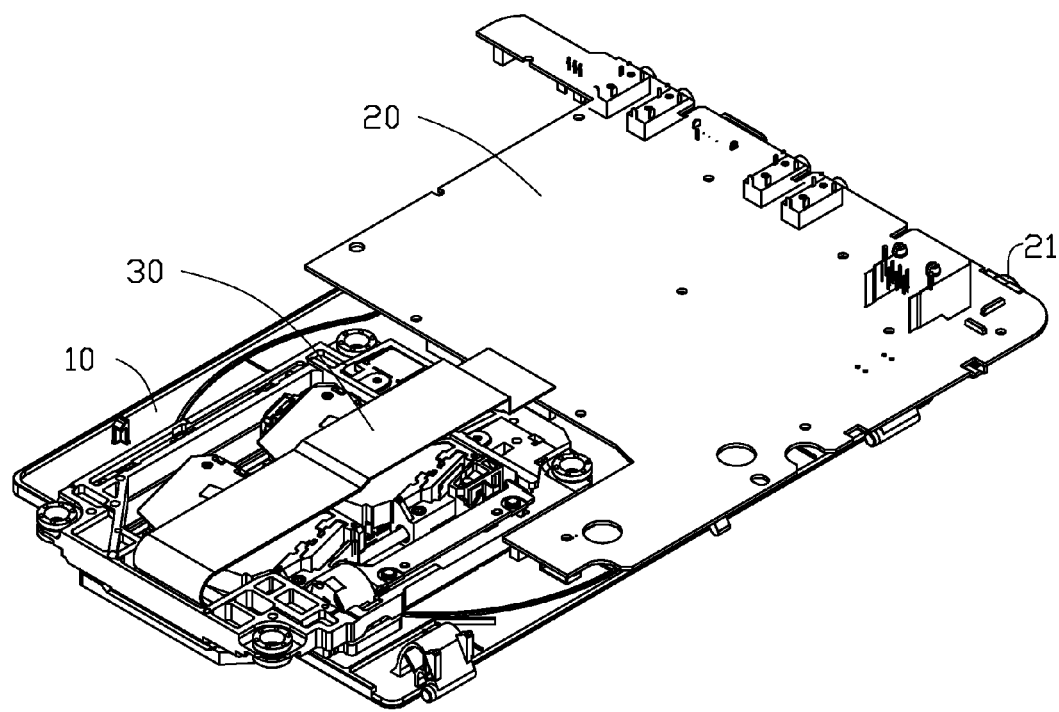
FIG. 2 is a schematic view of the electronic device of FIG. 1 with an electro magnetic interference shielding board thereof removed.

Referring to FIG. 1 and FIG. 2, an electronic device 100, according to an embodiment, includes a driving device 10, a circuit board 20, a flat cable 30, and an electro magnetic interference (EMI) shielding board 40. The electronic device 100 can be a portable DVD player, a notebook computer, or a projector. In this embodiment, the electronic device 100 is a portable DVD player.

The driving device 10 is for accessing data stored in the electronic device 100. The driving device 10 includes a space for receiving an optical disk and an optical disk driver for rotating the optical disk and using lasers to retrieve information on the optical disk.

The circuit board 20 is located at a side of the driving device 10. The circuit board 20 is configured for controlling the driving device 10 and receiving the data retrieved by the driving device 10. The circuit board 20 includes a power interface 21 arranged on a lateral side portion thereof, away from the driving device 10. The power interface 21 is configured for connecting with an external power supply, thereby providing electric power to the electronic device 100. The circuit board 20 further includes a data interface (not illustrated) for interchanging data with the optical disk driver of the driving device 10.

The flat cable 30 is connected between the data interface of the circuit board 20 and the optical disk driver of the driving device 10, thereby transmitting data there between. The flat cable 30 includes two distal end portions respectively connected to the driving device 10 and the data interface of the circuit board 20, and a middle portion between the two distal end portions.

The shielding board 40 is made of metal material for shielding electro magnetic interference from the driving device 10, the circuit board 20 and the flat cable 30. The shielding board 40 includes a first side 400 and a second side 402 opposite to the first side 400. The driving device 10 and the circuit board 20 are both arranged at the first side of the shielding board 40.

The shielding board 40 further includes a first through slot 41 and a second through slot 42. The first through slot 41 and the second through slot 42 are both configured in the shielding board 40, and penetrate the shielding board 40 along a thickness thereof. In order to avoid the flat cable 30 being abraded from too tight of a fit when the flat cable 30 is being passed through the first and second through slots 41,42, the first and second through slots 41,42 each have a length slightly longer than the width of the flat cable 30, and a width slightly longer than the thickness of the flat cable 30.

The flat cable 30 passes through the shielding board 40 via the first through slot 41 (from the first side to the second side) and the second through slot 42 (from the second side to the first side) in succession. As such, the middle portion of the flat cable 30 sits at the first side of the shielding board 40, and the remaining two distal end portions of the flat cable 30 sit at the second side of the shielding board 40. In this embodiment, a sum of lengths of the two distal end portions is bigger than a length of the middle portion.

Due to the fact that the flat cable 30 passed through the shielding board 40 twice respectively along reverse directions, the flat cable 30 is positioned against the shielding board 40 without using an adhesive force to hold it to the shielding board 40. Accordingly, the flat cable 30 is fixed without using any adhesive. During the repair of the electronic device 100, the flat cable 30 can be easily pulled out without being damaged.

It is to be said that, an amount of the flat cable 30 and the through slots of the shielding board 40 is not limited as above disclosed. The amount of flat cables and through slots can be correspondingly adjusted according to an actual demand.

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. An electronic device comprising:
   an EMI shielding board with a first side and a second side opposite to the first side;
   two electronic components arranged at the first side of the EMI shielding board; and
   a flat cable connected between the two electronic components, wherein the EMI shielding board further defines a first through slot and a second through slot, the flat cable passes through the EMI shielding board via the first and second through slots, a part of the flat cable is on the first side of the EMI shielding board, and the remaining part of the flat cable is on the second side of the EMI shielding board.

2. The electronic device according claim 1, wherein the flat cable passes through the EMI shielding board from the first side to the second side via the first through slot, and successively passes through the EMI shielding board from the second side to the first side via the second through slot.

3. The electronic device according claim 2, wherein the flat cable comprises two distal end portions respectively connected to one of the two electronic components and a middle portion between the two distal end portions, the middle portion of the flat cable sits at the second side of the EMI shielding board, and the two distal end portions sit at the first side of the EMI shielding board.

4. The electronic device according claim 3, wherein a sum of lengths of the two distal end portions is bigger than a length of the middle portion.

5. The electronic device according claim 1, wherein the first and second through slots each have an extending direction parallel to that of each other.

6. The electronic device according claim 5, wherein each slot length is slightly longer than the width of the cable and each slot width is slightly longer than the thickness of the cable.

7. The electronic device according claim 1, wherein the remaining part of the flat cable is against the EMI shielding board.

\* \* \* \* \*